United States Patent [19]

Davis

[11] 4,071,280
[45] Jan. 31, 1978

[54] VEHICLE WHEEL APPARATUS

[75] Inventor: Dalton M. Davis, Palos Verdes Estates, Calif.

[73] Assignee: Pyramid Enterprises, Inc., Torrance, Calif.

[21] Appl. No.: 93,724

[22] Filed: Nov. 30, 1970

[51] Int. Cl.$^2$ .............................................. B60B 1/08
[52] U.S. Cl. .................................. 301/65; 29/159.03; 29/521; 301/67
[58] Field of Search ............... 301/63, 64, 65, 64 SD, 301/67; 29/508, 521, 159.1, 159.03

[56] References Cited

U.S. PATENT DOCUMENTS

| | | | |
|---|---|---|---|
| 1,759,059 | 5/1930 | Mogford | 301/67 |
| 1,854,416 | 4/1932 | Mogford | 301/67 |
| 1,948,324 | 2/1934 | Woodward | 301/67 |
| 3,250,571 | 5/1966 | Richter | 301/67 X |

Primary Examiner—Trygve M. Blix
Assistant Examiner—Reinhard J. Eisenzopf
Attorney, Agent, or Firm—Spensley, Horn & Lubitz

[57] ABSTRACT

An apparatus and method of manufacture of an inflatable tire supporting rim and spider apparatus wherein portions of the rim is cold worked into depressions formed in the spider, thereby forming an integral unit.

10 Claims, 6 Drawing Figures

INVENTOR.
DALTON M. DAVIS
BY JACK C. MUNRO
AGENT

VEHICLE WHEEL APPARATUS

BACKGROUND OF THE INVENTION

The field of this invention relates to inflatable tire supporting structures and more particularly to an improved apparatus and method of manufacture of connecting the central spider of the wheel to the tire supporting rim.

It has been common practice for a great number of years to mount the inflatable tire upon a steel rim and then to secure the steel rim to the wheel drum of an automobile. Normally, such steel rims were formed as an integral unit in a rough cast form. In an effort to improve the appearance of the spider section of the wheel, which is centrally located with respect to the rim, it has been common to employ the use of a hub cap which is designed to be ornamental and pleasing to the eye. A large number of different types of hub caps of various designs have been employed.

Within the past few years it has been common to make ornamental the spider portion of the wheel itself thereby eliminating the need for a hub cap. It has been found that if the spider portion is formed of a nonferrous metal such as aluminum or magnesium, the spider is more respective to styling as by chrome plating than a steel spider. However, it has not been particularly easy to establish a strong, leakage free connection between the non-ferrous spider and the ferrous rim.

Most such rims are to support a tubeless tire wherein the rim must establish an airtight connection with the tire. It has been common practice in the past to rivet the rim to the spider. However, riveting inherently produces an aperture through the rim into the spider. As a result, it has been common that a non-perfect rivet connection causes the pressurized air within the tire to leak out past the rivet. Also, although a satisfactory rivet connection is initially established, after a period of time the rivet may loosen permitting the pressurized air to leak from the tire.

In an effort to overcome the use of rivets there have been numerous attempts at welding the spider to the rim. However, the welding of a non-ferrous metal to a ferrous metal is not easily accomplished even by the most skilled artisan. Further, the welding technique is inherently time consuming. The cost of manufacture of such wheel assemblies is substantially increased when using the welding technique.

It would be desirable to design a way of securing a non-ferrous spider to a ferrous rim without employing the use of welding or riveting techniques. It is desirable that the connection of the spider to the rim be extremely high strength and also absolutely preclude any leakage of air from the tire. Further, such a connection should be established quite economically and within a minimum amount of time, thereby lowering the manufacturing cost.

SUMMARY OF THE INVENTION

The apparatus and method of manufacture of the wheel assembly of this invention relates to the forming of a plurality of depressions around the outer surface of the periphery of the spider. The depressions are preferably formed substantially cone-shaped with the side-wall of the depression being at a 45° angle with the circumferential spider wall. The spider is to be located in a snug fitting manner within the ferrous tire supporting rim. A male dimple tool which is circular in cross sectional configuration and is relieved at its end thereof at a 45° angle is to be employed to cold work areas of the rim into each depression. The cold working is to be such as to cause the steel rim to flow plastically but not fracture. It is normally envisioned that approximately 15 depressions are to be formed in a spaced relationship about the spider. With the rim being cold worked within each of the depressions, a substantially integral high strength unit is formed between the spider and the rim.

The primary feature of the apparatus of this invention is that a rim and spider assembly is formed which is of extremely high strength and the connection will not fail under impact load prior to the spider itself failing.

DETAILED DESCRIPTION OF THE SHOWN EMBODIMENT

Figure 1:
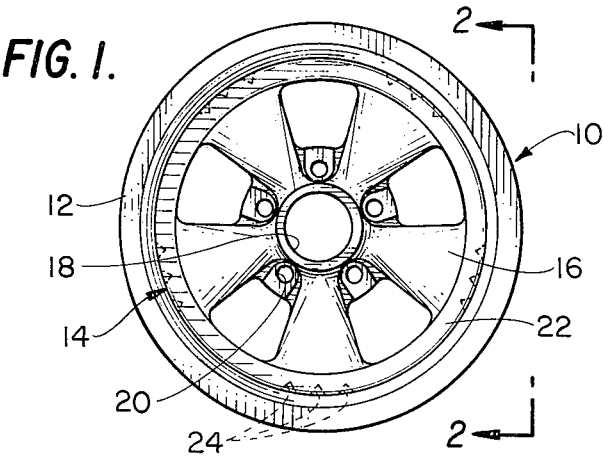
FIG. 1 is a front view of the wheel assembly of this invention.
Figure 2:
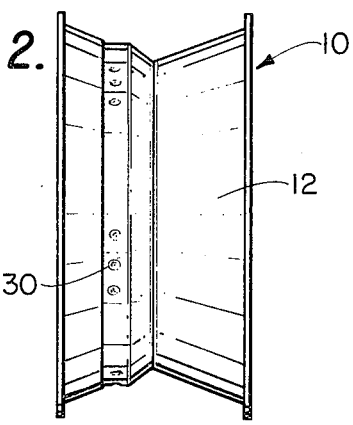
FIG. 2 is a right side view of the wheel assembly of this invention taken along line 2—2 of FIG. 1.
Figure 3:
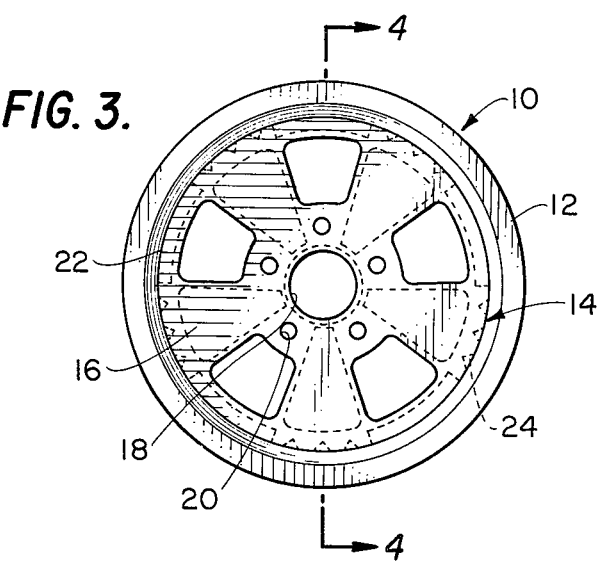
FIG. 3 is a back view of the wheel assembly of FIG. 1.
Figure 4:
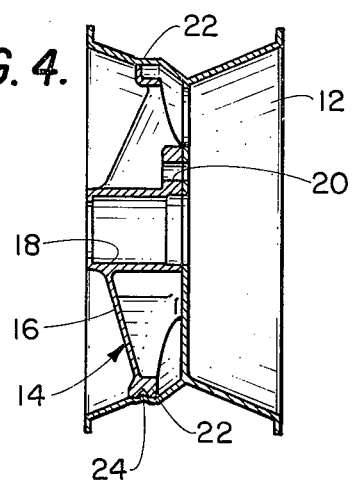
FIG. 4 is a cross sectional view through the wheel assembly of this invention taken along line 4—4 of FIG. 3.
Figure 5:
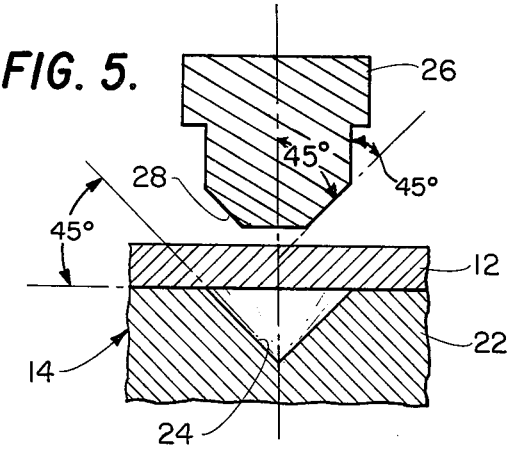
FIG. 5 is a fragmentary cross sectional view of the wheel assembly of this invention prior to the effecting of the dimpling operation by means of the male dimpling tool.
Figure 6:
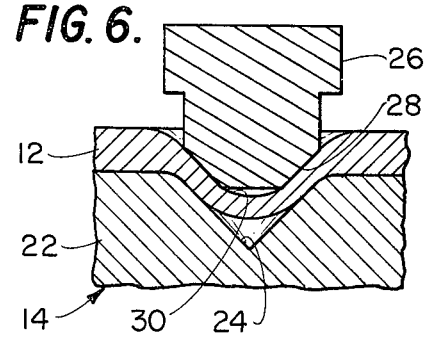
FIG. 6 is a view similar to FIG. 5 but showing the male dimpling tool having effected the dimpling operation and cold working of the rim within a depression within the spider.

Referring particularly to the drawing, there is shown in FIG. 1, the wheel assembly 10 of this invention being composed of a tire supporting rim 12 and a spider 14. The configuration of the rim 12 is basically conventional with an inflatable rubber tire to be retained about the circumference of the rim 12. The rim 12 is normally composed of a ferrous material of construction such as steel or steel alloy.

The spider 14 may assume any of numerous configurations, the spoked configuration being depicted for illustrative purposes. Basically the spider 14 inculdes a plurality of spokes 16 which equiangularly spaced from each other and extend radially from a central hub aperture 18. A plurality of mounting holes 20 are located adjacent the central hub aperture 18 and are to facilitate attachment of the wheel assembly 10 of this invention to the drive drum of an automobile. An annular element 22 is integrally connected to the free end of each of the spokes 16 and is concentrically disposed with respect to the central hub aperture 18. It is to be noted that the entire spider 14 is to be formed of a non-ferrous material such as aluminum, magnesium or alloys thereof.

The outer diameter of the spider 14, in other words annular element 22 is to be of such a dimension as to establish a press fit or interference fit with the inner diameter of the rim 12. It has actually been found to be best that not only a snug fit occur between the rim 12 and the spider 14 but it is required that the spider 14 be forcibly inserted within the rim 12 prior to the dimpling operation, which will be described in the following description.

Formed within the annular element 22 about its circumferential surface are a plurality of inwardly extending, radially located depressions 24. It is to be noted that there are preferably three in number such depressions 24 adjacent each spoke 16. Since there are five in number of such spokes 16 employed, there are fifteen such depressions 24 formed within the annular element 22. However, it is to be understood that the number or location of the depressions 24 is to be strictly a matter of choice or design.

The depressions 24 may also assume any basic configuration. However, applicant has found that if the walls of the depression are substantially at a 45° angle with respect to the outer surface of the annular element 22, the best results are obtainable. The cross sectional configuration of the depression 24 is basically in the shape of a circle. One of the best ways in which to form each of the depressions 24 is with a tip of a conventional drill bit.

To effect the connection of the rim 12 to the spider 14, the male dimpling tool 26 is to be employed. Basically, the tool 26 is substantially circular in configuration and is of a circular size substantially equal to the largest circular dimension of the depression 24. The application end of the tool 26 is relieved generally in the form of a chamfer 28. Generally, this relieving is such that the chamfer 28 forms a 45° angle with the cylindrical sidewall of the tool 26. The tool 26 is to be forcibly moved by means of an actuating apparatus (not shown) to deform the portion of the rim 12 into the depression 24. This actuating apparatus may be manual in operation or normally will take the form of hydraulic ram. Care must be taken that the force of moving the tool in cooperation with the depression 24 will not be so great as to cause the ferrous material of the rim 12 to exceed its plastic range. In other words, care must be taken so that any fracture, even though very minute, will not occur within the rim 12 during the dimpling operation. The reason for this is that even the smallest crack will permit leakage of the pressurized air within the tire which is supported about the rim 12.

The dimpling operation is to be such as to effect a cavity 30 within the outer surface of the rim 12 which is formed by permanent cold working rim material to extend partially within a depression 24. It is to be noted that there will be inherently produced a reduction in area of the rim material adjacent the outer circumference of the depression 24. But at the apex of the cavity 30, a small amount of reduction in area occurs or actually no reduction. This is very desirable as normally if a fracture was to occur of the rim 12, it would first occur in the area of the apex of the cavity 30. The inventor has found that by the using of this particular 45° relationship, extremely small or practically no reduction in area of the apex in the cavity 30 occurs.

Although the 45° angle has been described as being preferable, it has been found that satisfactory results can be achieved if the angle is any where from 23° to 45°. Generally, if the angle exceeds 45°, there is a greater tendency for the rim 12 to fracture during the dimpling operation. At the lower angle (less than 23°) the connection established between the rim 12 and the spider 14 is normally not sufficient to withstand an impact test. In other words, under an impact test the connection will fail prior to the spider failing. With the 45° angle employed, the connection is so strong between the rim 12 and spider 14 that the spider itself fails prior to the connection failing.

It is to be understood that the dimpling operation could be effected individually for each depression 24. However, it is actually envisioned that upon mass production of the wheel assemblies 10 of this invention that the entire unit would be placed within an appropriate machine which would effect the dimpling operation of all fifteen depressions simultaneously. Although it is desirable that the dimpling operation be effected without heating of the rim 12, in some instances or with certain types of material it may be desirable to raise the temperature of the rim 12 a predetermined amount.

This invention provides a method and apparatus of forming a wheel assembly which is extremely rigid and forms an extremely positive mechanical lock connection between the rim 12 and the spider 14. The dimpling process can be effected with the material in the cold state which therefore makes the process more economical than hot dimpling. Further, once the dimpling process is effected, there is no need for any additional welding or riveting or any other extraneous operation prior to useage of the wheel assembly. In conclusion, the wheel assembly of this invention results in the connecting of a ferrous rim to a non-ferrous spider which has higher strength characteristics than previous known methods, yet can be accomplished more economically and with minimum manufacturing time.

I claim:

1. A vehicle wheel assembly comprising:
   a central spider section formed of nonferrous metal and providing a hub and a full outer peripheral ring, and having a plurality of circumferentially spaced, radially inwardly extending dimplelike depressions formed in the outer surface of said ring remote from said hub, said depressions being of diminishing cross section in at least the outer portion thereof; and a pneumatic tire rim of malleable metal surrounding said central spider section in concentric relationship therewith and with an inner surface engaging said ring;
   said rim having dimples formed therein providing radially inwardly extending protuberances extending into the aforesaid depressions in the peripheral surface of said central spider section in a tight fit therewith and in intimate contact with at least the upper edge and the outer portion of the sides of said depressions, so as to hold said rim and said central spider section in a rigid unitary assembly.

2. The vehicle wheel assembly defined in claim 1, in which said central spider section includes a plurality of spokes extending radially outwardly from said hub, and in which said dimplelike depressions are formed in the outer edges of said spokes.

3. The vehicle wheel assembly defined in claim 1, in which said malleable rim is formed of steel and said central spider section is formed of aluminum alloy.

4. The method of making a wheel assembly comprising the steps of:
   a. providing a spider assembly having a plurality of radially extending, equiangularly spaced spokes;
   b. forming radially inwardly a plurality of circumferentially spaced conical depressions in the periphery of each of said spokes;
   c. locating the spider assembly within a circular rim, said step of locating including establishing an interference fit between the rim and the spider assembly; and
   d. permanently deforming portions of the rim into and adjacent each of said conical depressions.

5. A method as defined in claim 4 wherein said step of forming includes forming the walls of the said conical depressions at 45° angles with respect to the periphery of each of the spokes.

6. A method as defined in claim 4 wherein said step of permanently deforming includes substantially eliminating the reduction of area of the portions of the rim adjacent each of the conical depressions.

7. A vehicle wheel assembly comprising:
 a. a non-ferrous spider assembly including a central hub and a plurality of solid radially extending, equiangularly spaced spokes, said spokes each having a plurality of circumferentially spaced conical depressions disposed in the periphery thereof, each of said conical depressions directed radially inwardly along the axis of said spokes; and
 b. a circular rim being disposed about said spider in an interference fit therewith, said rim having permanently deformed cavities depending into and adjacent each of said conical depressions, said cavities being in intimate contact with said conical depressions.

8. A vehicle wheel assembly as defined in claim 7 wherein the walls of said conical depressions form a 45° angle with respect to the periphery of said spokes.

9. A vehicle wheel assembly as defined in claim 7 wherein portions of said rim within said cavities have substantially no reduction in area.

10. The method of making a wheel assembly comprising the steps of:
 a. providing a spider assembly having a plurality of radially extending, equiangularly spaced spokes interconnected by an outer peripheral ring;
 b. forming radially inwardly a plurality of circumferentially spaced depressions in the periphery of each of said spokes;
 c. locating the spider assembly within a circular rim, said step of locating including establishing an interference fit between the rim and the spider assembly; and
 d. permanently deforming portions of the rim into and adjacent each of said depressions in a tight interlocking fit therewith.

* * * * *